United States Patent
Pook et al.

(10) Patent No.: US 7,864,302 B2
(45) Date of Patent: Jan. 4, 2011

(54) METHOD FOR DETECTING OBJECTS WITH A PIVOTABLE SENSOR DEVICE

(75) Inventors: Sebastian Pook, Paderborn (DE); Martin Soika, Landshut (DE)

(73) Assignee: Siemens Aktiengesellschaft, Munich (DE)

( * ) Notice: Subject to any disclaimer, the term of this patent is extended or adjusted under 35 U.S.C. 154(b) by 241 days.

(21) Appl. No.: 12/224,312

(22) PCT Filed: Feb. 1, 2007

(86) PCT No.: PCT/EP2007/050980
§ 371 (c)(1),
(2), (4) Date: Oct. 27, 2008

(87) PCT Pub. No.: WO2007/096240
PCT Pub. Date: Aug. 30, 2007

(65) Prior Publication Data
US 2009/0310117 A1    Dec. 17, 2009

(30) Foreign Application Priority Data
Feb. 22, 2006    (DE) .................. 10 2006 008 275

(51) Int. Cl.
*G01C 3/08* (2006.01)
(52) U.S. Cl. .................. 356/4.01; 356/4.1; 356/5.01; 356/5.1
(58) Field of Classification Search ....... 356/3.01–3.15, 356/4.01–4.1, 5.01–5.15, 6–22, 28, 28.5
See application file for complete search history.

(56) References Cited

U.S. PATENT DOCUMENTS

| 5,475,494 | A | 12/1995 | Nishida et al. |
| 6,204,755 | B1 | 3/2001 | Kikuchi |
| 6,466,946 | B1 | 10/2002 | Mishra et al. |
| 6,792,684 | B1 * | 9/2004 | Hyyppa .................. 33/1 A |
| 7,046,841 | B1 * | 5/2006 | Dow et al. .................. 382/154 |

FOREIGN PATENT DOCUMENTS

| DE | 43 44 485 A1 | 6/1994 |
| DE | 199 37 185 A1 | 2/2000 |
| WO | 00/03311 | 1/2000 |
| WO | 02/075653 A2 | 9/2002 |

OTHER PUBLICATIONS

International Search Report for Application No. PCT/EP2007/050980; mailed Apr. 16, 2007.

* cited by examiner

*Primary Examiner*—Thomas H Tarcza
*Assistant Examiner*—Luke D Ratcliffe
(74) *Attorney, Agent, or Firm*—Staas & Halsey LLP

(57) ABSTRACT

A scan sensor emits detection beams for detecting objects in a scanning area within a scanning plane. The position of the scanning plane is changed by pivoting the sensor device in a scanning area, to produce multiple detection planes. Detection points of objects in the surroundings of the sensor device are detected by the detection beams in the detection planes. Lines are extracted from the detection points of a respective detection plan. Measuring points are determined at the intersection points of the lines with one or more predetermined measuring planes. The measuring points in a respective measuring plane are classified into blocks and lines are extracted on a block basis from the measuring points of the blocks generated, as a result of which structures of objects in the measuring planes are determined.

25 Claims, 5 Drawing Sheets

1.)

2.)

3.)

1.)

2.)

METHOD FOR DETECTING OBJECTS WITH A PIVOTABLE SENSOR DEVICE

CROSS REFERENCE TO RELATED APPLICATIONS

This application is based on and hereby claims priority to German Application No. 10 2006 008 275.3 filed on Feb. 22, 2006, the contents of which are hereby incorporated by reference.

BACKGROUND

Described below is a method for detecting objects with a pivotable sensor device which includes a scan sensor and a corresponding device.

Nowadays odometric and gyroscopic measurements are frequently used to navigate driverless transport vehicles. In the case of these measurements, the position of the vehicle is determined using appropriate sensors on the vehicle. In particular, the difference in distance covered by the vehicle is detected using sensors on the wheel of the vehicle. However, the sensors used are subject to measurement uncertainties, which result in position errors during the operation of the vehicle. Because of these errors, it is not possible to navigate driverless transport vehicles using odometry and gyroskopy alone. It is therefore necessary to use methods to improve the estimation of the vehicle position.

Such methods for improving the position estimation use, for example, laser scanners. In a known method, objects in the floor area of the vehicle are detected in a two-dimensional scanning plane of the laser scanner. Hereby the scanning plane is essentially parallel to the floor so that only objects in the floor area can be used for navigating. This is disadvantageous when using driverless transport systems in a commercial environment, especially in warehouses. In particular there is the problem here that objects in warehouses often change their position, so that a driverless transport vehicle can no longer orient itself because objects are no longer present or new objects appear.

In addition to the two-dimensional navigation systems just described, arrangements are known where a laser system is used to make a three-dimensional measurement of the surroundings of the vehicle are known. Hereby the features of the surroundings are present in so-called 3D-point clouds, wherein to navigate, the point clouds are compared with previously determined point clouds, in order to determine the particular position of the vehicle. These methods are very complex.

SUMMARY

Thus, described below is a method for detecting objects which is simpler than known methods and which can also be used in environments in which the position of objects in the floor area and at vehicle height frequently changes.

In the method described below, a scan sensor emits detection beams for detecting objects in a scanning range within a scanning plane, wherein the position of the scanning plane is changed by swiveling the sensor device in a swivel range, as a result of which a plurality of detection planes are produced. Detection points of objects in the surroundings of the sensor device are detected by the detection beams in the detection planes. Lines are then extracted from the detection points of a respective detection level. To this end, known line extraction methods are used, for example a so-called divide-and-conquer method, which is explained more fully in the detailed description below. The purpose of these methods is to detect flat surfaces of objects in the surroundings, whereby these flat surfaces in the detection level are represented as lines. Next, the intersection points of the lines with one or several predetermined measuring planes are determined as measuring points.

The aim of the method is now to process these measuring points in such a way that in the measuring plane lines can again be extracted using a line extraction method. In order to achieve this, the measuring points in a respective measuring plane are classified into blocks as follows:

for a measuring point that is to be classified, the measuring point, which is selected from the measuring points that are contained in already existing blocks and that meet a predefined distance criterion, is the one which is at the shortest distance from the measuring point to be classified, wherein the predetermined distance criterion for a respective measuring point in a respective block is met, if the distance of the measuring point to be classified from the respective measuring point is shorter than a distance measure, which depends on the distance of the respective measuring point from an adjacent measuring point of the respective block;

the measuring point to be classified is placed adjacent to the selected measuring point in the block that contains the selected measuring point.

The distance criterion described below takes into account in particular the distance of a measuring point to an adjacent measuring point, a suitable criterion is created with which points that belong to the same observation area of the scan sensor, are appropriately combined into blocks. Subsequently lines can in turn be extracted on a block basis from the measuring points of the blocks generated. This makes it possible to use a known line extraction method in a measuring plane.

In a very simple way, the method makes it possible to detect objects in a so-called "virtual measuring plane", without having measured in the measuring plane itself. Rather the measuring plane is created by a section through all detection planes. In particular this allows the sensor device also to detect objects in height planes that are above the sensor device. Above all, objects can be detected that are in the ceiling area of a warehouse. This allows navigation in a warehouse, in which the position of objects in the floor area is constantly changing as such objects in the floor area are not used for the navigation. Rather it is only objects in the ceiling area, which usually do not or only seldom change their position, that are viewed.

There is an advantage that the measuring point to be classified is placed behind the selected measuring point.

If, for a measuring point that is to be classified, it should occur that classification into an existing block in accordance with the criteria described herein is not possible, a new block is formed for the measuring point to be classified. Likewise, in the case that at the beginning of the method there are as yet no blocks present, a block is formed by the measuring point to be classified and the measuring point which is at the shortest distance from the measuring point to be classified.

It is advantageous if the predefined distance criterion for a respective measuring point is met if the distance from the measuring point to be classified to the respective measuring point of a pair of adjacent measuring points in the respective block is shorter than the distance between the measuring points of the pair multiplied by a factor, where the factor is greater than or equal to 1.

It is advantageous if the factor is smaller than 2, preferably essentially 1.5. It has been shown that through the choice of the factor in this area very good results are achieved in classifying the measuring points into the blocks. In particular the following line extraction method works very well.

In another embodiment, it is further ascertained that when classifying only measuring points whose absolute distance does not become too great are observed. For that reason, in one embodiment of the method, the measuring point to be classified is only classified into the block that contains the selected measuring point if the distance from the selected measuring point to the measuring point to be classified is shorter than a predetermined absolute measurement.

The method has proven to work particularly well if the measuring point to be classified is only classified into the block that contains the selected measuring point if the distance between the measuring point to be classified and an approximated straight line of best fit through the measuring points of the block and of the measuring point to be classified is less than a predetermined value.

In order, in the method, to take into consideration in an appropriate manner also those blocks that only have one measuring point, the measuring point of this block is always treated as a measuring point that meets the predefined distance criterion. That means that blocks that only contain one measuring point are always taken into consideration when a new measuring point is being classified.

It is advantageous for classifying of measuring points to run parallel while the sensor device is being pivoted and the detection beam is detecting. In this way a real-time method for extracting lines from virtual measuring planes is created.

In the case where the method is used in a vehicle operating without a driver, it may occur that the vehicle moves in such a way that lines that are extracted at the beginning of the pivoting concern the same object as lines that are extracted at the end of the pivoting. Therefore, it is advantageous that after the sensor device has been pivoted from one end of the swivel range to the other end of the swivel range, a check is made using a distance criterion as to whether blocks generated can be combined into bigger blocks.

The method may be used to navigate vehicles operating without a driver. In this case, the extracted lines are compared with lines from objects that were previously detected and stored in a memory, and if they coincide the vehicle is localized using the position data of the line. In order to estimate and calculate the position of the vehicle use is made, for example, of the Kalman filter, which is known.

Preferably in the method the detection planes are essentially in planes which extend in a vertical direction, and the sensor system is pivoted around an essentially vertical axis. Thus a very large detection area can be assured. Thereby the measuring planes are preferably horizontal planes that are situated above the sensor system. The swivel range can include, for example, an angle range of essentially 90 degrees and the scanning range can be situated, for example, in an angle range of at least 180 degrees, in particular of essentially 190 degrees. In order to achieve very good detection of objects in the ceiling area, when the scan sensor is being pivoted it is set at an angle of inclination around a vertical swiveling axis and pointing upwards, preferably with an angle of inclination of essentially 45 degrees. In addition a scan sensor in the form of a laser scanner enables particularly precise position measurements to be achieved.

The above described method can be implemented using a device for detecting objects that contains a computer unit, which carries out the line extraction, the computation of the intersection points and also the classification of measuring points.

An especially preferred area of application for this device is its use in driverless vehicles, wherein the device is used in this case for the driverless navigation of the vehicle, and this by the extracted lines in the respective measuring plane being compared with lines of objects previously detected and stored in a memory. Hereby the vehicle is preferably a robot, in particular an automatically driven fork lift truck or an automatically driven cleaning machine.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
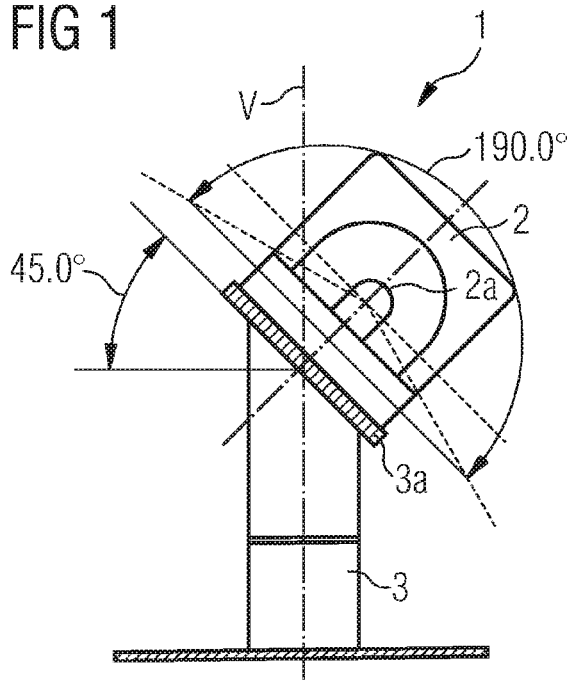
FIG. 1 is a side view of the sensor device used in an embodiment of the method.

Reference will now be made in detail to the preferred embodiments, examples of which are illustrated in the accompanying drawings, wherein like reference numerals refer to like elements throughout.

In the embodiment described below, the method for navigating robots, i.e. for operating a machine without a driver in a limited area of space, is used. Hereby the method is a possibility especially for robots used in an industrial environment, for example for a forklift truck operated without a driver in an industrially used hall. The problem there is that the robot has difficulty in being able to orientate itself by the spatial features in the bottom area of the hall, as in industrial halls objects are very often moved and shifted and as a result new objects are continually being detected that are not known to the robot. Hence the robot can localize itself very badly. As a result the robot cannot navigate itself independently through the warehouse in order to carry out tasks according to a predefined schedule of use.

In order to solve the problem presented above, according to the method in the embodiment described here a sensor device is mounted on the robot in such a way that it detects the area of the ceiling of the warehouse, which normally does not change. To detect the ceiling, according to FIG. 1 a sensor device 1 is used, which device has a laser scanner 2 with a laser source 2a, the laser source generating laser beams in a vertical scanning plane (i.e., in the sheet plane of FIG. 1), within a scanning range of 190 degrees. The laser scanner 2 is attached to a pedestal 3, which pedestal has a plate 3a on its upper face slanting at an angle of 45 degrees to horizontal. Hereby the pedestal can be pivoted back and forth around a vertical axis V in a swivel range of 90 degrees by a swivel motor. Because the laser scanner 2 is aligned to point upwards and also because of the wide covering scanning range of 190 degrees, according to the arrangement shown in FIG. 1 the ceiling area of a hall in which a robot with attached sensor device 1 moves is detected. As known objects (also called features) in the ceiling area are to be used in order to navigate the robot, then it must be made possible for objects in a horizontal measuring plane in the ceiling area to be detected. The method accomplishes this as is explained in more detail below.

The principle on which the navigation of a robot is based is that the robot, using the laser scanner shown in FIG. 1, determines objects known to it in the space by distance measurements and so determines its own position in a stored map. To make this possible, the robot must determine its position in a fixed reference coordinate system, which is also called world coordinate system W. This world coordinate system is the global reference system, in which the robot moves and in which it locates itself. In addition there is a so-called robot coordinate system R, which is the local reference system of the robot. The robot is modeled in the robot coordinate system according to the determination of the origin. The evaluation of the laser distance measurements is also carried out in the robot coordinate system. In addition there is also the so-called laser coordinate system L. This system is the reference system, in which the laser distance measurements are given by the laser scanner 2. These distance measurements are first converted from polar coordinates into Cartesian coordinates in the laser coordinate system so that the distance measurements can be processed meaningfully. To this end, in a first transformation, points are calculated in Cartesian coordinates from the distances determined and the angle increment between the laser beams. In order to render this data usable for the extraction of features for detecting objects as carried out in the method, additional transformations are necessary. These transformations are used to model the mounting position of the laser scanner 2 on the robot and in so doing take into consideration the mounting position of the laser scanner on the swivel motor, the position of the swivel motor at the time of the laser scan and also the mounting position of the swivel motor on the robot. The following transformations are necessary to be able to show the objects detected by the laser scanner in world coordinates:

$^{L}T_{H}$: Transformation of polar coordinates of detected obstructions H into Cartesian coordinates, i.e. points in the laser coordinate system. The conversion is done using the distances measured and the difference of the angle between the individual laser beams. This difference is constant and is 0.36 degrees in the laser scanner used in the embodiment described here $^{M2}T_{L}$: This transformation describes the mounting position of the laser scanner in relation to a swiveling coordinate system M2 of the swivel motor. The mounting position of the laser scanner is determined by the structure of the measuring system.

$^{M1}T_{M2}$: This transformation describes the position of the motor of the swivel motor in relation to a reference coordinate system M1 of the motor. The transformation contains only one variable angle. This angle is determined by the function for controlling the swivel motor.

$^{R}T_{M1}$: This transformation describes the mounting positions M1 of the swivel motor relative to the robot coordinate system R.

$^{W}T_{R}$: This transformation is used to calculate the robot position in the world coordinate system W. The robot can localize itself by the determination of this transformation. The origin of the world coordinate system is in the embodiment of the starting point of the robot as described here.

$^{W}T_{H}$: This transformation is used to convert the detected objects (obstructions) from distance measurements into world coordinates.

The following calculation rule results to represent the measurements in world coordinates:

$$^{W}T_{H} = {^{W}T_{R}} \cdot {^{R}T_{M1}} \cdot {^{M1}T_{M2}} \cdot {^{M2}T_{L}} \cdot {^{L}T_{H}}$$

Figure 2:
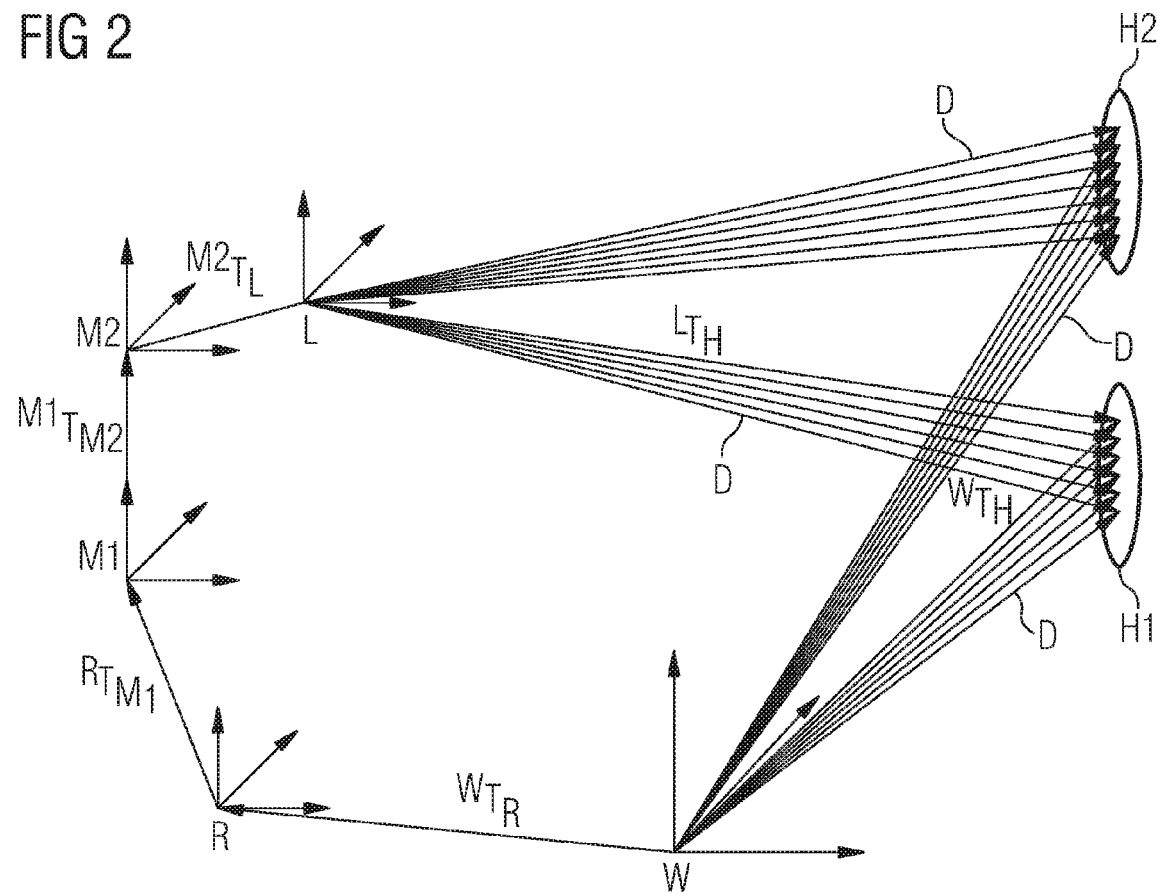
FIG. 2 is a schematic diagram to illustrate the transformations carried out in the inventive method in order to determine the position of detection points.

FIG. 2 again illustrates in schematic form the position of the individual coordinate systems W, R, M1, M2 and L in relation to each other as well as the above mentioned transformations between the coordinate systems. By way of illustration, bundles of distance lines D are reproduced each to two objects H1 and H2 both in the coordinate system L and also in the coordinate system W.

In the method the characteristic features of objects are registered in the form of lines, wherein a line essentially represents a flat surface, e.g. a wall in the surroundings of the robot. In order to limit the number of detection points of the laser scanner used for the line extraction, a line extraction is always only applied in each case to the amount of detection points that are detected when moving the sensor system from one end of the swivel range to the other. The travel movement from one end of the swivel range to the other is also called motor panning. As when the motor is panning in addition the position of the travelling robot also changes, the data registered in a pan must be transformed into a common reference system. The robot position $R_0$ at the point in time the direction of the swivel motor is changed is set as the origin of this common reference system. The subsequent scans i are first in the robot coordination $R_i$ of the changed robot position. Therefore the transformation $^{R0}T_{Ri}$ is applied to the positions registered in a robot position $R_i$ by a laser scanner, which transformation transforms the coordinates in the robot coordinate system $R_i$ into the robot coordinate system $R_0$. With the aid of the above mentioned transformation $^{W}T_{R}$, which transforms robot coordinates into world coordinates, the transformation from the robot coordinate system $R_i$ to the robot coordinate system $R_0$ by the transformation from the coordinate system $R_0$ to the world coordinate system W and the inversion of the transformation from the coordinate system $R_0$ into the coordinate system W can be represented as follows:

$$^{R0}T_{Ri} = ({^{W}T_{R0}})^{-1} \cdot {^{W}T_{Ri}}$$

In this way a common reference system is set for all detection points determined in one motor pan and from this the three-dimensional positions of the detection points in the reference system $R_0$ can be determined.

In order to further reduce the number of detection points, a so-called line extraction method, which is described in more detail below, is used to extract the lines determined in a scanning plane in the course of a scan. Hereby the lines represent detected flat surfaces. In the embodiment of the method described here, the scanning plane is in a vertical direction during the detection, so that it is always lines passing in the vertical scanning plane (hereinafter also referred to as "vertical lines") that are extracted.

Figure 3:
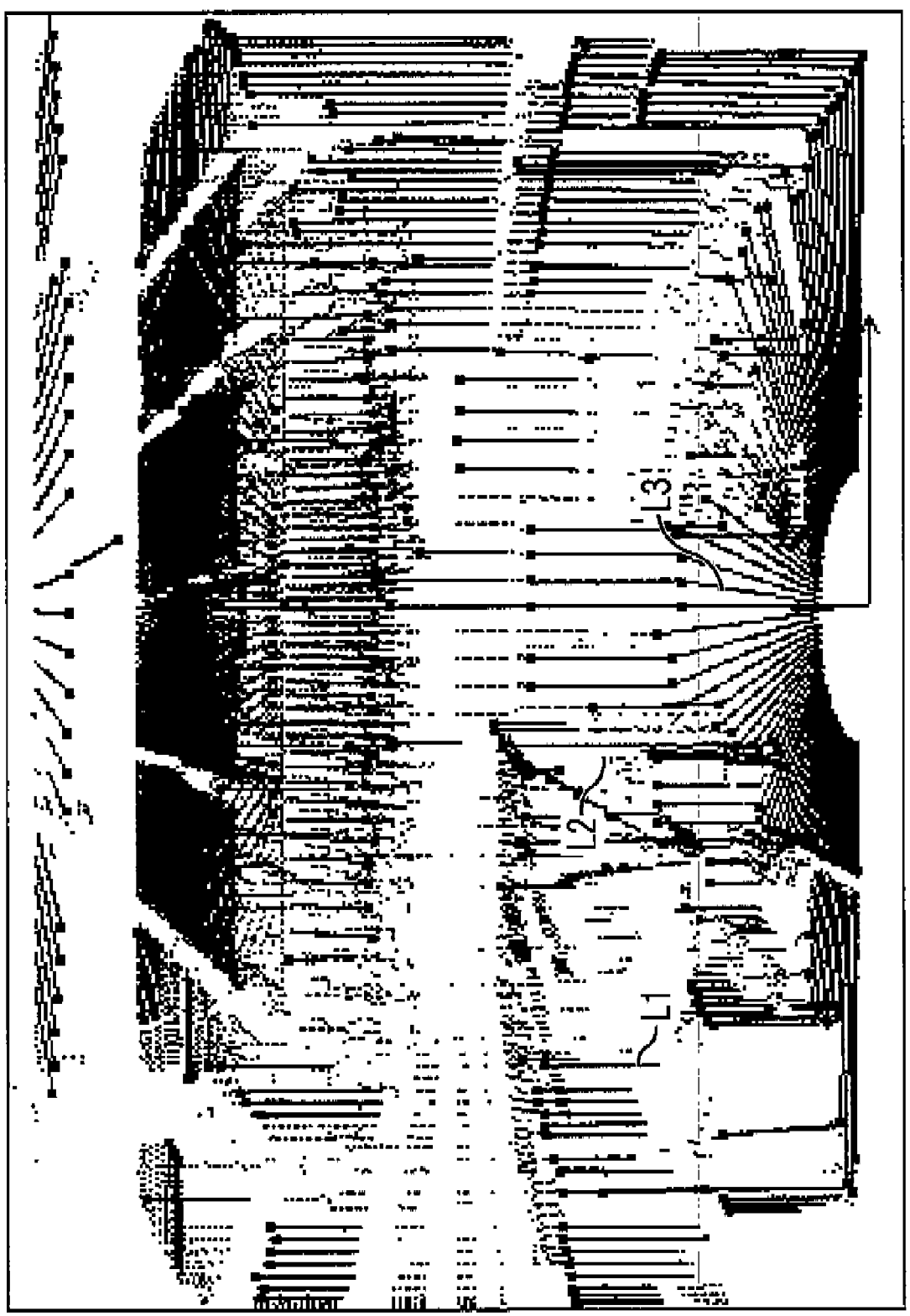
FIG. 3 is a perspective view of the lines extracted in vertical detection planes.

FIG. 3 illustrates clearly the vertical lines determined in this way by a laser scanner pan when detecting the surroundings in an industrial hall. By way of example, three lines were denoted by the reference characters L1, L2 and L3.

Figure 4:
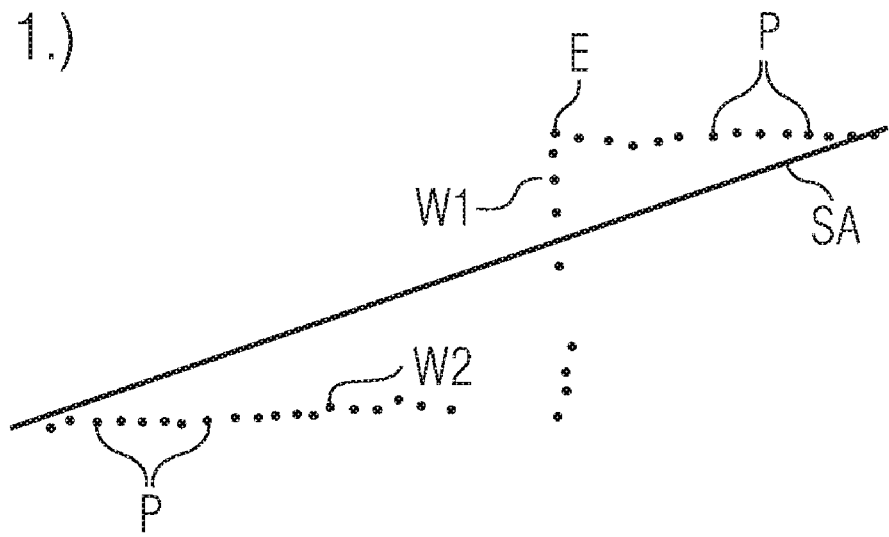
FIG. 4 is a schematic diagram of the methods used in the method to extract lines from detection points and measuring points.
Figure 4:
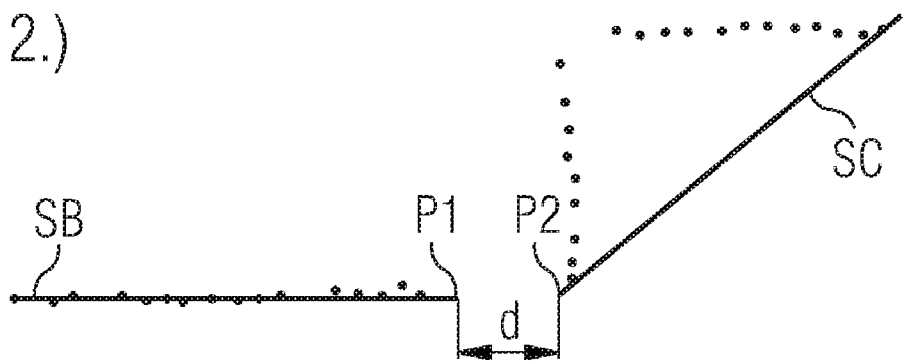
Figure 4:
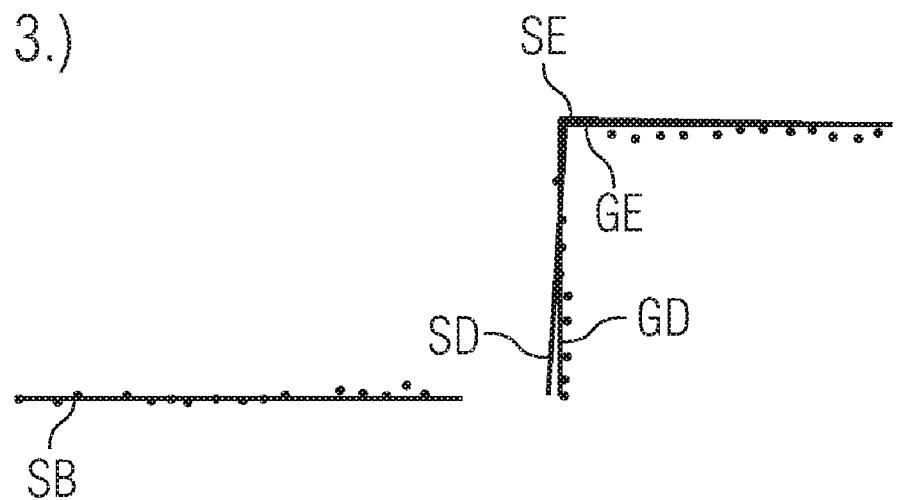

FIG. 4 shows in schematic form how, within a scanning plane or a measuring plane M (described in more detail below), using a line extraction method, lines can be formed from the detection and measuring points respectively. The method used for this is a known method, which is also known under the name "divide-and-conquer". The individual diagrams 1.), 2.) and 3.) in FIG. 4 show the steps in such a method. FIG. 4 shows a plurality of determined detection and measuring points P respectively, which represent a wall W1 which goes round a corner E and also a wall W2 which is arranged at a distance d from the wall W1. For reasons of clarity, the reference character P has been provided on only a few of the measuring points.

In the line extraction, the measuring points are first divided into segments with a variable number of measuring points. In a set of measuring points, two segments are distinguished if the distance between two points exceeds a maximum value. Hereby the measuring points are in a sorted sequence, for example according to the angle of emergence of the laser beam in the case that the points were detected by a laser beam in a scanning plane. Hereby a segment straight line is determined for each segment, which line connects the start and end point of the segment to each other. The segmentation is illustrated in steps 1.) and 2.). First there is a single segment A, which is wherein the segment straight line SA. Then the distances between the individual sorted points is checked, wherein FIG. 4 results in the case that the distance d between the segment points PI and P2 exceeds a predefined maximum value. Thereupon two segments B and C are formed and are represented by the segment straight lines SB and SC.

Finally the line extraction within the segment is carried out using a recursive method. This is applied to each segment and divides these segments again into smaller segments. Hereby, first a straight line of best fit through all the measuring points of a segment is calculated, whereby the straight line of best fit is a straight line averaged across the measuring points of the segment, which straight line is, for example, determined using linear regression. Then the distance from the straight line of best fit to the individual measuring points in the segment is determined. If the distance from a measuring point to the straight line of best fit exceeds a set maximum distance, the segment is divided up at this point. Thus two new segments are created. In the further processing, this procedure is repeated recursively for all the segments that arise in this way. The method ends if there are no more separable segments left. A segment is no longer separable, either when no point in the segment exceeds the maximum distance to the straight line of best fit or when the segment has fallen below a minimum number of points. In the latter case, the method ends with a failure, i.e. it was not possible to extract a line.

FIG. 4 shows the result of such recursive processing in diagram 3.). Here it can be seen that the segment with the segment line SB already represents an extracted line, as the distances from the points to the calculated straight line of best fit are less than a set maximum value. On the other hand the recursion applied to the segment C has resulted in two new segments D and E, of which the segment lines are denoted as SD and SE. In addition the straight lines of best fit GE and GD are shown in FIG. 4. It can be seen that the algorithm has correctly determined the course of the walls W1 and W2 by the extraction of corresponding lines.

The segmenting method described above is only one example of the ways in which lines can be extracted from a number of measuring points. If necessary, other known techniques can also be used for extracting lines.

Figure 5:
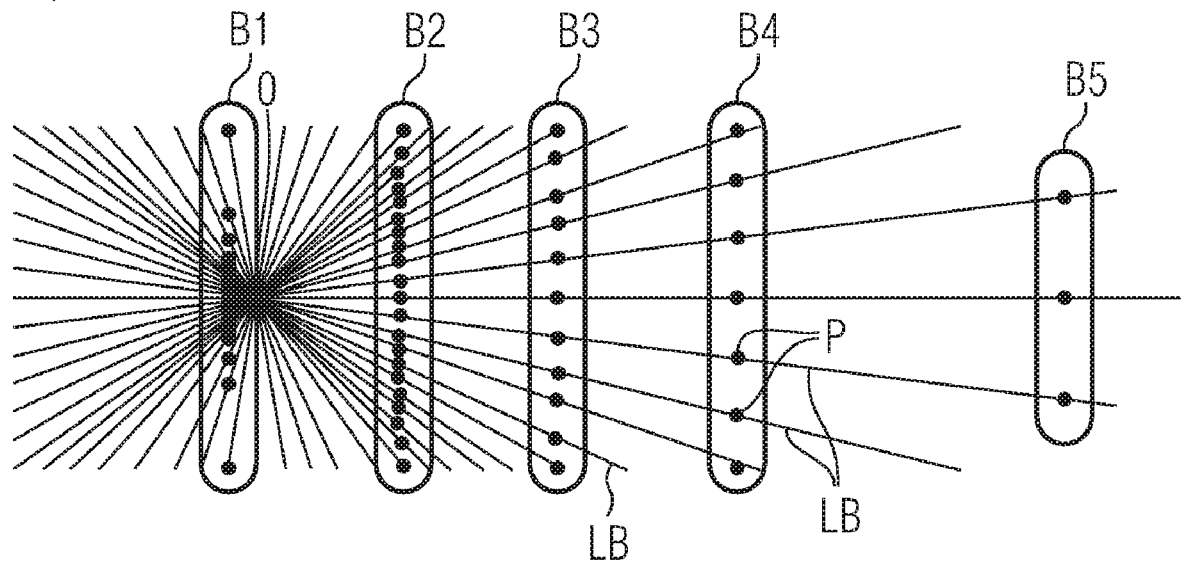
FIG. 5 is a schematic diagram to illustrate the problem definition solved in accordance with the method.
Figure 5:
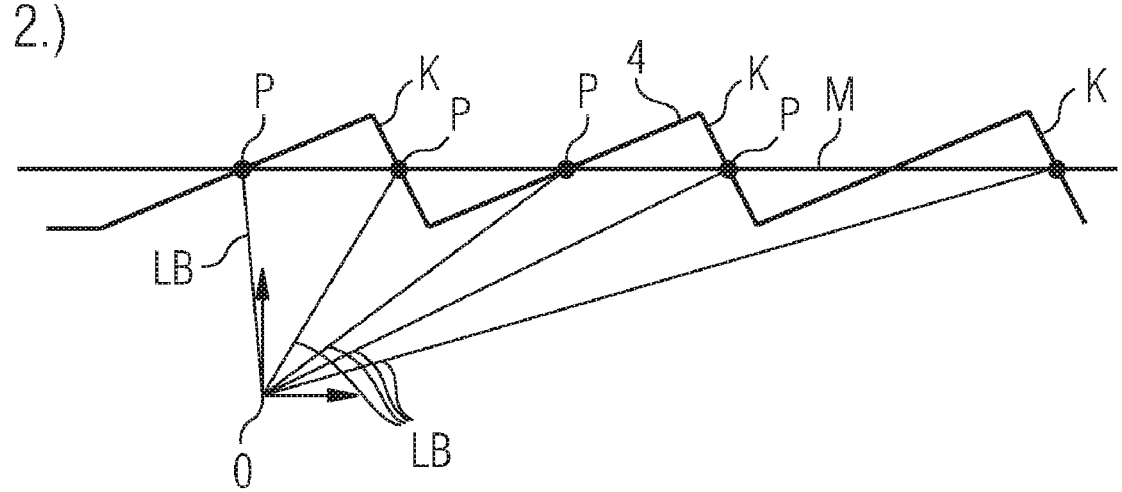

In the method first, using a known method, vertical lines are extracted, and this namely, for example, using the method shown in FIG. 4. In order now to detect objects in the ceiling area, these lines are intersected by height planes above the robot in the ceiling area. This results in a plurality of intersection points in each height plane. The intersection points are called measuring points and do not in the literal sense represent measured points, but virtual points. Here there arises the problem that the measuring points are not sorted, so that the method describe above for line extraction cannot be applied easily in the horizontal height plane. It is especially problematic that by cutting the vertical lines with height planes, measuring points situated one behind the other are also determined, which points would not be registered in an actual scan in the corresponding height plane. This problem is explained in FIG. 5 using a shed roof-shaped ceiling construction in a warehouse. Diagram 2 in FIG. 5 shows the intersected side view of such a shed roof shaped ceiling 4. In addition the position of a height plane M is shown, which is intersected by the previously extracted lines. This results in the determination of a plurality of measuring points P, wherein in FIG. 4 in addition, for each of these measuring points, the laser beam LB, which, in a scan in vertical direction, is responsible for detecting this point, is drawn in.

The diagram 1 in FIG. 5 shows the same scenario as diagram 2, but in a horizontal projection from above. Hereby the laser beams LB beam out from the mounting position 0 of the laser scanner on the robot. As the individual measuring points P are in unsorted sequence and belong to different observation angles, a known line extraction method cannot be easily applied. Moreover, first it must be determined which points belong to the same observation direction. This problem is solved in the method by classifying the points in individual blocks in accordance with a predefined criterion, whereby the sort criterion is chosen in such a way that all the points within a block essentially correspond to the same observation direction.

Diagram 1 in FIG. 5 shows corresponding blocks B1, B2, B3, B4 und B5, which are generated in accordance with the method. Hereby each block corresponds to a short edge K of the shed roof, so that the individual measuring points within the individual blocks can be extracted again with corresponding classifying using a known line extraction method.

In order to achieve such a division into blocks B1 to B5, a suitable method was developed, wherein in the course of a scan newly arriving measuring points in the measuring plane M are classified into blocks, so that a numbered sequence of the measuring points is formed in the blocks. This method is explained using FIG. 6 and FIG. 7. At the beginning of the method there are no blocks at all. A first block is formed for example by two measuring points whose distance to each other falls below a predetermined value. If a measuring point is added to this then it is checked whether the distance from the additional measuring point to the two points of the first block is shorter than 1.5 times the distance between the points of the first block. If that is the case, the added measuring point is placed behind the measuring point that is at the shortest distance to the measuring point to be classified, in as far as this shortest distance is shorter than a predetermined maximum value. If the above distance criterion is not met or the maximum value is exceeded, a new block is formed for the measuring point. Subsequently a check is made for a newly added measuring point to see from which measuring point the new measuring point is at the shortest distance. If the shortest distance between the new measuring point and a measuring point is in the already existing block of several measuring points, the new measuring point is classified into the existing block of several measuring points, in as far as the shortest distance is shorter than the maximum value and shorter than 1.5 times the distance from the measuring point in the block to one of its adjacent robots. Otherwise, the measuring point is classified into a block that only contains one measuring point, if the distance between these measuring points is the shortest or if the criterion of the 1.5 times the distance to adjacent points was not met for the measuring point in the block of several measuring points, wherein further, the distance between the measuring point to be classified and the measuring point in the block of the single measuring point must fall below the maximum value. If this is not the case, a new block with a single measuring point is again formed.

Figure 6:
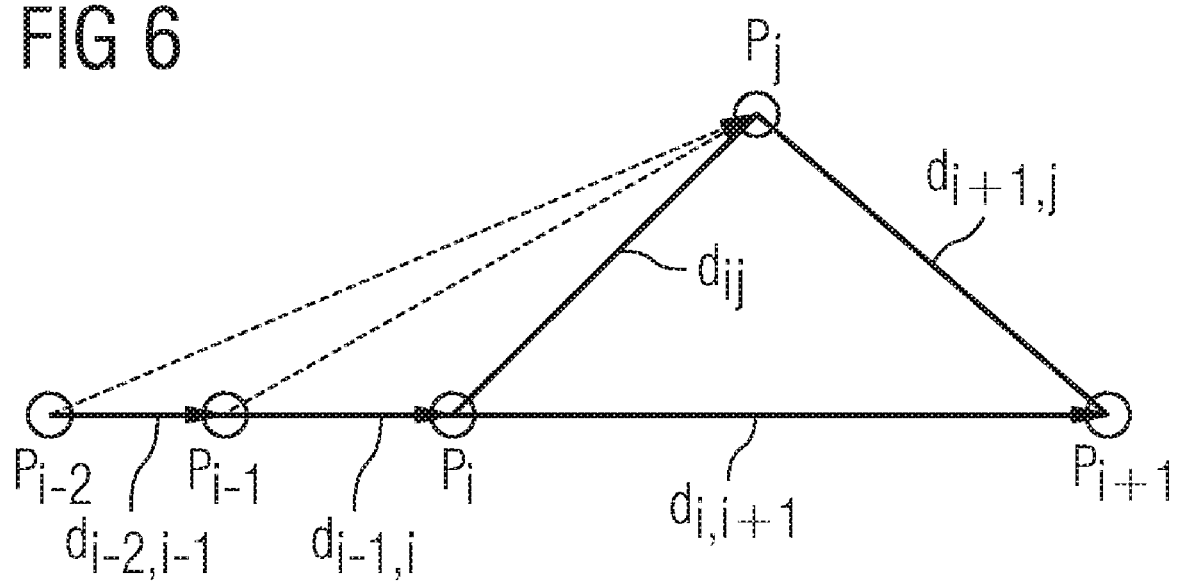
FIGS. 6 and 7 are schematic diagrams to illustrate the method used in the method in order to classify measuring points into blocks.

FIG. 6 illustrates the classification of the measuring points using a section from an already existing block with the classified measuring points $P_{i-2}$, $P_{i-1}$, $P_i$ and $P_{i+1}$ in the block. Hereby it is checked whether a new measuring point $P_j$ which is to be classified can be classified into this. To this end the distance $d_{i-2,\,i-1}$ between the measuring points $P_{i-2}$ und $P_{i-1}$, the distance $d_{i-1,\,i}$ between the measuring points $P_{i-1}$ and $P_i$ and also the distance $d_{i,\,i+1}$ between the measuring points $P_i$ und $P_{i+1}$ are viewed. Hereby for each distance it is checked whether the distance from the point $P_j$ to each of the two end points of the distance is shorter than 1.5 times the distance itself. This criterion is not met for the distances $d_{i-2,\,i-1}$ and $d_{i-1,\,i}$.

For the distance $d_{i,\,i+1}$ the distance $d_{ij}$ meets the criterion that it is shorter than 1.5 times the distance of $d_{i,\,i+1}$. The distance $d_{i+1,\,j}$ does not meet this criterion, as it is longer than 1.5 times the distance $d_{i,\,i+1}$. In accordance with the embodiment of the method described here, the point $P_j$ is then placed after the point that is at the shortest distance from $P_j$, i.e. the point $P_j$ is placed between $P_i$ and $P_{i+1}$.

Figure 7:
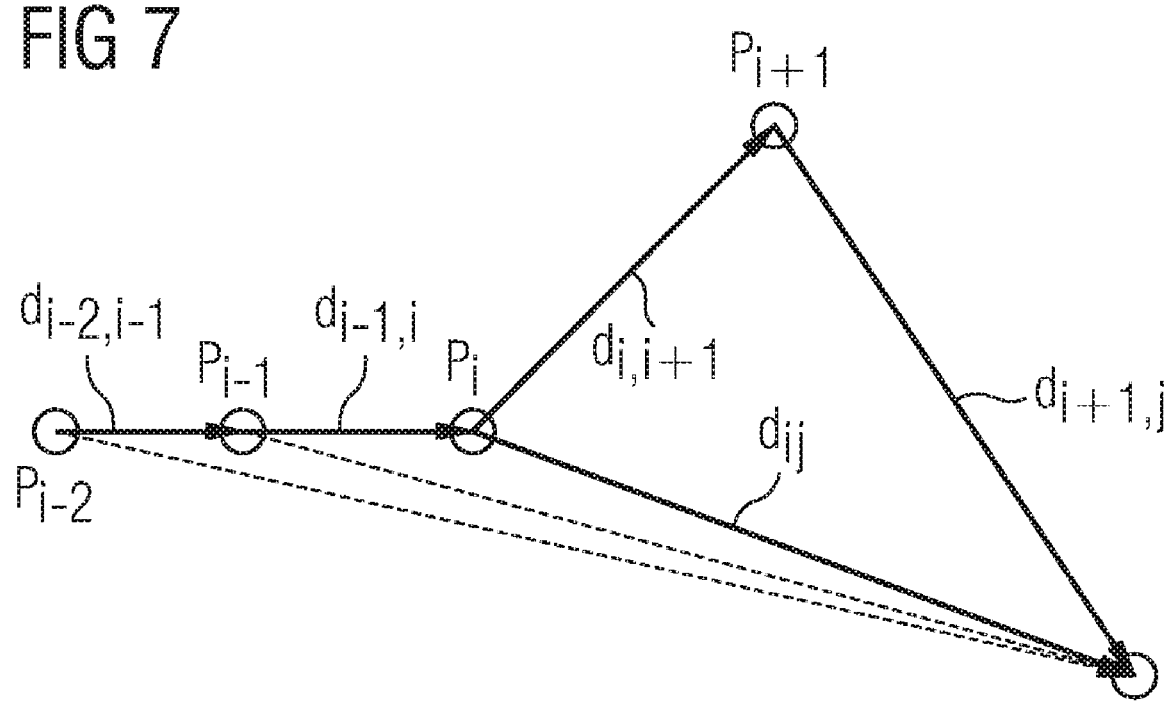

FIG. 7 shows a similar scenario as FIG. 6, wherein likewise a section of a block with the measuring points $P_{i-2}$, $P_{i-1}$, $P_i$ and $P_{i+1}$ is viewed. The same denotations as in FIG. 6 are used for the distances between the points. By analogy with FIG. 6, the distance criterion, according to which the distance from $P_j$ to one of the end points of the distances must be shorter than 1.5 times the distances themselves, is not met for the distances $d_{i-2,\,i-1}$ and $d_{i-1,\,i}$. With respect to the distance $d_{i,\,i+1}$ the distance criterion is met, but not for the distance $D_{ij}$, but for the distance $d_{i+1,j}$. Therefore, in contrast to FIG. 6 the point $P_j$ is not placed between Pi and Pi+1, but is added behind the point $P_{i+1}$.

The advantage of the distance criterion described above is that the sporadically occurring inaccuracies do not result in the breaking down of a block so easily. However, sometimes points are wrongly assigned to a block because the tolerances are too large. If these points are too far away from the straight lines of best fit calculated for a block, a line extractor subsequently applied to the blocks interrupts the line at this point. In this case, instead of a secure extracted line, two lines are created with a greater stochastic uncertainty. Therefore, an additional limiting criterion may be used for assigning a point to a block. According to this criterion, first the straight line of best fit of a block is recalculated iteratively when a new point is added. Points that are too far away from this straight line of best fit are then not accepted into the block. A new block is then formed for such a point that is not accepted into the block.

In addition after a motor pan has been performed, an attempt may be made to link the blocks created to each other. This is necessary when surfaces are captured at the start of a motor pan, then get lost and are captured again at the end of the motor pan. In rare but observable cases, the start point of one of the two blocks created in this way joins to the end point of the other of the two blocks.

After the formation of blocks in accordance with the method described above now a known line extraction method is applied to the individual blocks. This is now possible as the individual points are in sorted sequence. Hereby, by way of example, the extraction method described using FIG. 4 is used.

The method described above has the great advantage that, in this method points can be detected in so-called "virtual measuring planes", so that it becomes possible, using the method, to determine measuring points above the sensor device, in particular in the ceiling area. Thus the method is very suitable for robot navigation in warehouses, as there navigation in lower planes is often not possible, because there are cargo goods in such halls, and the position of these goods often changes.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method for detecting objects with a pivotable sensor device having a scan sensor, comprising:

emitting detection beams from the scan sensor to detect objects in a scanning range within a scanning plane, while changing a position of the scanning plane by pivoting the sensor device in a swivel range, as a result of which a plurality of detection planes are produced;

detecting detection points of objects in surroundings of the sensor device using the detection beams in the detection planes;

extracting first lines from the detection points of a respective detection plane;

determining measuring points as intersection points of the lines with at least one predetermined measuring plane;

classifying the measuring points in the respective measuring plane into blocks by for a measuring point to be classified, selecting another measuring point, from among those measuring points in already existing blocks that meet a predefined distance criterion, as having a shortest distance from the measuring point to be classified, where the predetermined distance criterion for a respective measuring point in a respective block is met if a first distance between the measuring point to be classified and the respective measuring point is shorter than a distance measure which depends on a second distance of the respective measuring point from an adjacent measuring point of the respective block, and placing the measuring point to be classified, adjacent to the selected measuring point, in a block containing the selected measuring point; and extracting second lines on a block basis from the measuring points in the blocks generated to determine structures of objects in the measuring planes.

2. The method as claimed in claim 1, wherein said placing places the measuring point to be classified behind the selected measuring point.

3. The method as claimed in claim 2, further comprising forming a new block for the measuring point which is to be classified, when no other measuring point can be selected.

4. The method as claimed in claim 2, further comprising forming a new block for the measuring point which is to be classified, when no blocks are yet present, by placing the measuring point to be classified and the other measuring point having the shortest distance to the measuring point to be classified.

5. The method as claimed in claim 2, wherein the predefined distance criterion for the respective measuring point in the respective block is met if the measuring point to be classified is at a third distance from a pair of adjacent measuring points in the respective block which is shorter than a fourth distance between the pair of adjacent measuring points multiplied by a factor that is at least equal to 1.

6. The method as claimed in claim 5, wherein the factor is less than 2 and substantially equal to 1.5.

7. The method as claimed in claim 6, wherein said placing of the measuring point to be classified into the block containing the selected measuring point is only if the shortest distance from the selected measuring point to the measuring point to be classified is less than a predetermined absolute measurement.

8. The method as claimed in claim 7, wherein said placing of the measuring point to be classified into the block containing the selected measuring point is only performed if a fifth distance between the measuring point to be classified and an approximated straight line of best fit through the measuring points of the block and the measuring point to be classified falls below a predetermined value.

9. The method as claimed in claim 8, wherein when the respective block has a single measuring point therein, the single measuring point is rated as meeting the predefined distance criterion.

10. The method as claimed in claim 9, wherein said classifying and extracting the second lines are performed concurrently with said emitting, detecting, extracting the first lines and determining, and when a new measuring point is determined, said classifying of the new point begins immediately.

11. The method as claimed in claim 10, further comprising, after the sensor device has panned from one end of the swivel range to an opposite end of the swivel range, checking a distance criterion to determine whether the blocks generated by said classifying can be combined to form bigger blocks.

12. The method as claimed in claim 11, wherein said extracting of the first and second lines is carried out using a divide-and-conquer method.

13. The method as claimed in claim 12, wherein the method is used in navigating a vehicle and the method further comprises:
comparing the second lines with third lines from previously determined objects stored in a memory; and
determining a position of the vehicle relative to at least one of the objects if the second and third lines match, thereby enabling navigation of the vehicle without a driver.

14. The method as claimed in claim 13, wherein said determining the position of the vehicle uses a Kalman filter.

15. The method as claimed in claim 14, wherein the detection planes extend in a substantially vertical direction and the sensor system is pivoted around a substantially vertical axis.

16. The method as claimed in claim 15, wherein the measuring planes extending in a substantially horizontal direction.

17. The method as claimed in claim 16, wherein the measuring planes are substantially above the sensor system.

18. The method as claimed in claim 17, wherein the swivel range covers substantially 90 degrees.

19. The method as claimed in claim 18, wherein the scanning range includes an angle range of at least 180 degrees and substantially 190 degrees.

20. The method as claimed in claim 19, wherein the scan sensor when pivoted is oriented in an upwards direction at an angle of inclination around a vertical swiveling axis.

21. The method as claimed in claim 20, wherein the angle of inclination is substantially 45 degrees.

22. The method as claimed in claim 21, wherein a laser scanner is used as the scan sensor.

23. A device for detecting objects, comprising:
a sensor device with a scan sensor that, when in operation, emits detection beams to detect objects in a scanning range within a scanning plane while changing a position of the scanning plane by pivoting the sensor device in a swivel range, as a result of which a plurality of detection planes are produced, and detection points of objects in surroundings of the sensor device are detected by the detection beams in the detection planes; and
a computer unit coupled to said sensor device and programmed to extract first lines from the detection points of a respective detection plane, determine measuring points as intersection points of the lines with at least one predetermined measuring plane and classify the measuring points in the respective measuring plane are classified into blocks by
for a measuring point to be classified, selecting another measuring point, from among those measuring points in already existing blocks that meet a predefined distance criterion, as having a shortest distance from the measuring point to be classified, where the predetermined distance criterion for a respective measuring point in a respective block is met if a first distance between the measuring point to be classified and the respective measuring point is shorter than a distance measure which depends on a second distance of the respective measuring point from an adjacent measuring point of the respective block, and
placing the measuring point to be classified, adjacent to the selected measuring point, in a block containing the selected measuring point, and
extracting second lines on a block basis from the measuring points in the blocks generated to determine structures of objects in the measuring planes.

24. A vehicle operating without a driver, comprising:
a chassis supported by at least one transport mechanism;
a memory, mounted on the chassis, storing representational lines of registered objects;
a sensor device, mounted on the chassis, with a scan sensor that, when in operation, emits detection beams to detect objects in a scanning range within a scanning plane while changing a position of the scanning plane by pivoting the sensor device in a swivel range, as a result of which a plurality of detection planes are produced, and detection points of objects in surroundings of the sensor device are detected by the detection beams in the detection planes;
at least one computer unit, mounted on the chassis and coupled to said sensor device, programmed to extract first lines from the detection points of a respective detection plane, determine measuring points as intersection points of the lines with at least one predetermined measuring plane and classify the measuring points in the respective measuring plane are classified into blocks by for a measuring point to be classified, selecting another measuring point, from among those measuring points in already existing blocks that meet a predefined distance criterion, as having a shortest distance from the measuring point to be classified, where the predetermined distance criterion for a respective measuring point in a respective block is met if a first distance between the measuring point to be classified and the respective measuring point is shorter than a distance measure which depends on a second distance of the respective measuring point from an adjacent measuring point of the respective block, and placing the measuring point to be classified, adjacent to the selected measuring point, in a block containing the selected measuring point, extracting second lines on a block basis from the measuring points in the blocks generated to determine structures of objects in the measuring planes, and navigating the vehicle without a driver by comparing the second lines extracted from the respective measuring plane with the representational lines of the registered objects in said memory.

25. The vehicle as claimed in claim 24, wherein the vehicle is one of an automatically operating fork lift truck and an automatically operating cleaning machine.

* * * * *